(12) United States Patent
Weh et al.

(10) Patent No.: US 6,382,273 B1
(45) Date of Patent: May 7, 2002

(54) FUELLING FIXTURE

(75) Inventors: Wolfgang Weh; Erwin Weh, both of Illertissen (DE)

(73) Assignee: Weh GmbH Verbindungstechnik, Illertissen (DE)

( * ) Notice: Subject to any disclaimer, the term of this patent is extended or adjusted under 35 U.S.C. 154(b) by 0 days.

(21) Appl. No.: 09/254,851

(22) PCT Filed: Sep. 11, 1997

(86) PCT No.: PCT/EP97/04983

§ 371 Date: Mar. 11, 1999

§ 102(e) Date: Mar. 11, 1999

(87) PCT Pub. No.: WO98/10952

PCT Pub. Date: Mar. 19, 1998

(30) Foreign Application Priority Data

Sep. 11, 1996 (DE) .......................................... 296 15 806

(51) Int. Cl.⁷ .................................................. B65B 3/00
(52) U.S. Cl. ........................ 141/346; 141/383; 141/386
(58) Field of Search ............................. 141/3, 4, 5, 18, 141/21, 346, 382, 383, 386; 137/312, 800; 220/725, 746, 86.2

(56) References Cited

U.S. PATENT DOCUMENTS

| 3,297,064 A | * | 1/1967 | Moore et al. ................ 141/383 |
| 4,341,322 A | * | 7/1982 | Heinke ........................ 220/210 |
| 4,817,813 A | * | 4/1989 | Krause ....................... 220/86.2 |
| 5,095,947 A | | 3/1992 | Weh et al. |
| 5,301,723 A | * | 4/1994 | Goode ......................... 141/383 |

FOREIGN PATENT DOCUMENTS

| FR | 2696132 | * | 4/1994 |
| JP | 61-139518 | * | 6/1986 |
| JP | 63-192624 | * | 4/1994 |

\* cited by examiner

Primary Examiner—Steven O. Douglas
Assistant Examiner—Khoa D. Huynh
(74) Attorney, Agent, or Firm—Knobbe, Martens, Olson & Bear, LLP

(57) ABSTRACT

A fuelling fixture for vehicles includes a fuelling nipple configured to attach to a filling connection and a pot-like housing. The pot-like housing encloses the fuelling nipple and is configured to receive a filler cap enclosing the fuelling nipple.

12 Claims, 2 Drawing Sheets

FUELLING FIXTURE

FIELD OF THE INVENTION

The invention relates to a fuelling fixture for vehicles equipped with a fuelling nipple, to which a filling connection may be attached.

BACKGROUND OF THE INVENTION

Fuelling fixtures of this kind are already widely used for filling gas-powered vehicles. In this connection, particularly natural gas vehicles are increasingly gaining in importance due to their relatively low pollutant emissions and fuel consumption. On these vehicles, the fuelling fixture in mounted on the outside of the vehicle, but sometimes also on the inside of the vehicle or behind the body lids, in order to enable in this way a filling connection to be attached to the fuelling nipple of the vehicle. In this case, the fuelling fixture is connected to the gas tank of the vehicle by means of a high pressure hose. In this process, the fuelling nipple is often fastened to the vehicle body only by means of locknuts.

However, this attachment method bears a problem in that the fuelling nipple projects relatively far from the body area. Moreover, the filling opening of the fuelling nipple is often only closed with a plastic cap, which can, however, not fully prevent the fuelling nipple from getting dirty, especially when it is used in a dusty environment, or from freezing in winter. Therefore, there is a risk of foreign bodies or dirt particles entering the gas lines of the vehicle during fuelling, which can lead to excessive filter loading or even to inoperability.

SUMMARY OF THE INVENTION

It is therefore the object of the invention to provide a fuelling fixture for vehicles, which enables safe and secure installation und eliminates contamination of the fuelling nipple.

An aspect of the invention involves a fuelling fixture for vehicles. The fuelling fixture includes a fuelling nipple configured to attach to a filling connection and a pot-like housing. The pot-like housing encloses the fuelling nipple, and is configured to receive a filler cap enclosing the fuelling nipple.

The positioning of the fuelling nipple in a pot-like housing, into which a filler cap enclosing the fuelling nipple may be inserted or screwed, ensures complete covering of the fuelling nipple towards the outside. This ensures an absolutely dust-proof accomodation of the fuelling nipple. In addition, this pot-like housing, particularly in the embodiment having two housing sleeves fitted into each other, may be attached securely and stably to the body of the vehicle. This prevents any parts projecting from the body towards the outside, so that any risk of damage to the fuelling nipple is eliminated.

Moreover, it is preferred that upon insertion of the filler cap a sensor or micro-switch for immobilizing the vehicle is activated, which will prevent the vehicle from being started with the filling connection attached. Rather, the filling connection must be disconnected and the filler cap properly inserted in the pot-like housing for a starting of the vehicle to be possible. This safely prevents any accidents—as have already occurred in the past—occurring due to the vehicle being started and driven off whilst the filling connection is attached.

Further, by means of the filler cap screwed into the pot-like housing, a reliable seal is achieved, so that even in the case of a defective safety valve in the fuelling nipple, any uncontrolled escaping of gas is prevented. This is particularly important in cases where the fuelling fixture is installed in the passenger compartment or in a compartment in communication therewith (e.g. in the boot of a hatchback vehicle). The complete enclosure of the fuelling nipple thus allows a covered ventilation line to be connected to the pot-like housing in a simple manner, which can be used, if necessary, to branch of f any gas escaping from the fuelling nipple in a controlled manner to a safe place (e.g. under the bottom of the vehicle).

Further advantageous embodiments of the fuelling fixture are the subject matters of the subclaims.

BRIEF DESCRIPTION OF THE DRAWINGS

Three embodiment examples of the fuelling fixture will be explained and described below in more detail with reference to the drawings, wherein.

DETAILED DESCRIPTION OF THE INVENTION

Figure 1:
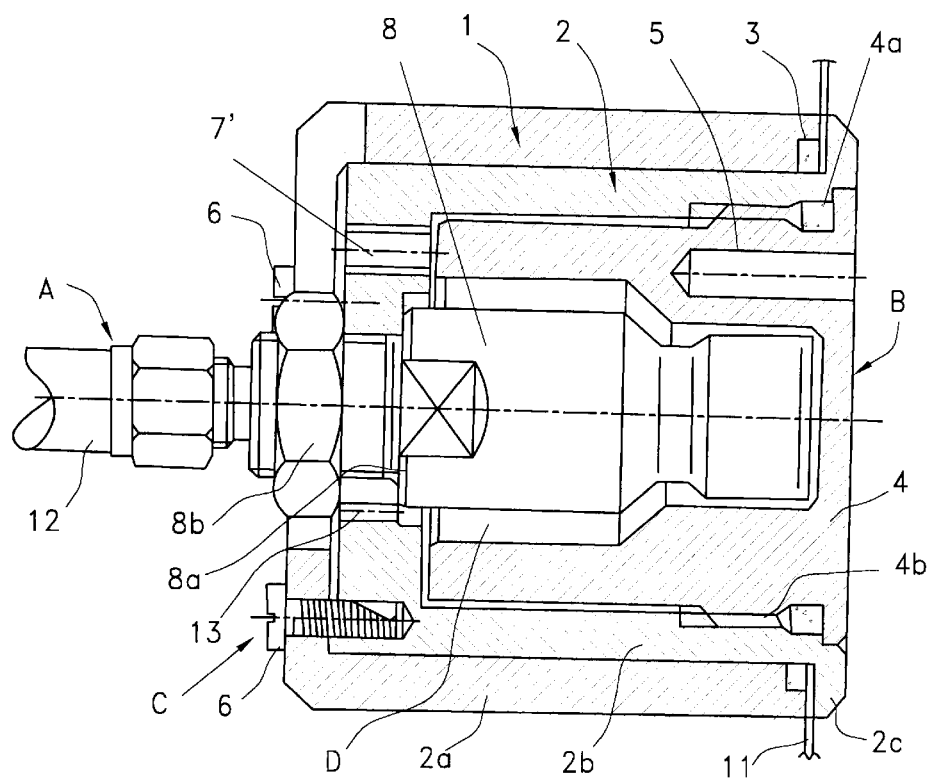
FIG. 1 shows a sectional view of a fuelling fixture.

FIG. 1 shows a longitudinal section of a fuelling fixture 1, in which a central, rotationally symmetrical fuelling nipple 8 is shown unsectioned. In this figure, reference literal A identifies the outlet side of the fuelling nipple 8, while the fuelling side is identified by the reference literal B. From the fuelling side B, a filling connection (not shown), such as disclosed in European Patent 0 340 879, may be connected to the fuelling nipple 8. It goes without saying that the filling connection is attached with the filler cap 4 removed. During fuelling, gas flows from the fuelling nipple 8 via a filling line 12 on the outlet side A to a tank (not shown) in the vehicle.

The fuelling fixture 1 has a bell—or pot-like housing 2 which surrounds the fuelling nipple 8. Into this pot-like housing 2, the above-mentioned filler cap 4 may be screwed, so that the fuelling nipple 8 is completely enclosed. The pot-like housing consists here of two also pot-like housing sleeves 2a, 2b fitted into each other, such that due to the counter-directed screwing of the two housing sleeves 2a and 2b by means of several screws 6, the pot-like housing 2 is fixed to the body 11 of the vehicle, of which a section is shown. As is evident from the bottom half of FIG. 1, the screws 6 provided on the front side C of the housing 2, pull the radially inner housing sleeve 2b with a ring-shaped collar 2c against the outer housing sleeve 2a, whereby the body sheet 11 of the vehicle is clamped therebetween, so that the fuelling fixture 1 is securely fastened to the body 11. Thus, the fuelling fixture 1 is essentially flush with the outer surface of the body 11, with the filler cap 4 also terminating flush with the outer surface of the housing 2. In this way, the detachable fasteners themselves, namely the screws 6 and the screw-fastening of the filling line 12, are accomodated internally of the body, so that any manipulation is prevented.

Figure 3:
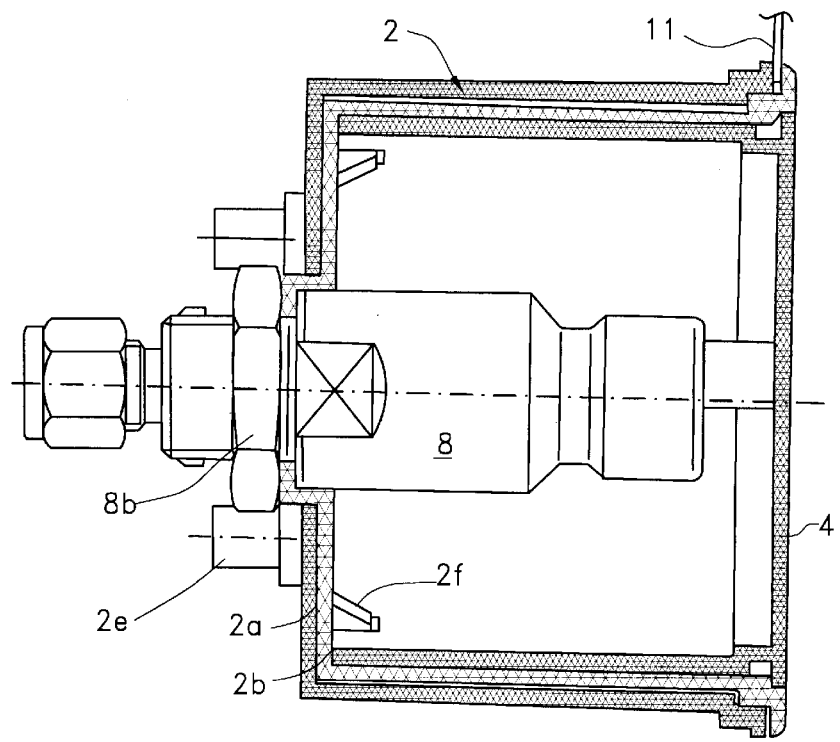
FIG. 3 shows a rotated view of a further simplified fuelling fixture similar to FIG. 1.
Figure 4:
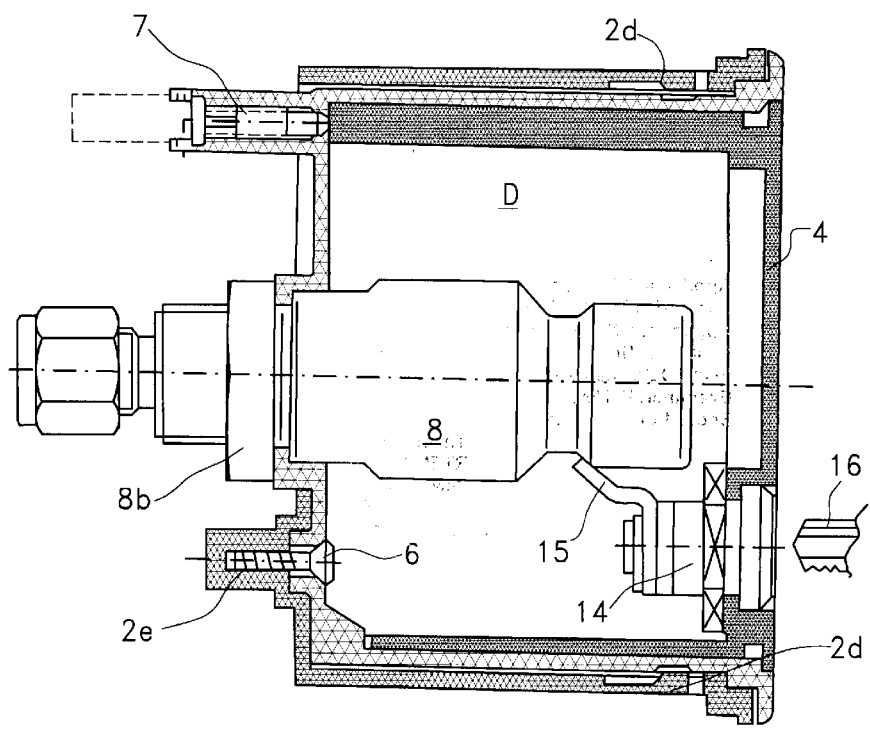
FIG. 4 shows another rotated view of a further simplified fuelling fixture similar to FIG. 1.

The same applies to the screw-fastening of the fuelling nipple 8 by means of a union nut 8b, by which the fuelling nipple 8 rests in a secure manner with a ring-shaped flange 8a on the inner housing sleeve 2b. By this means, secure fastening of the fuelling nipple 8 is achieved. The outer housing sleeve 2b may also be made of plastics, since the large-area contact with the body sheet 11 provides secure support. Because screw-fastening with the filler cap 4 is preferred, the radially inner housing sleeve 2b is made of steel. On the bearing area of the housing sleeves 2a or 2b, a ring seal 3 is provided to ensure that they rest securely and in a sealing manner on the edge of the section of the body. Such a seal may also be provided on the opposite ring-shaped collar 2c of the inner housing sleeve 2a. Further, a ring seal 4a is provided between the inner housing sleeve 2a and the filler cap 4, such that the interior of the fuelling fixture 1 is completely sealed. Preferably, the filler cap 4 is connected by means of a screw-thread 4b, but the screw-in movement may also be accomplished by bayonet fixing, or the cap may, as shown in FIG. 3, be simply inserted and locked by means of a lock 14 and a key 15.

Additionally, several blind bores 5 are preferably provided in the filler cap 4, which may be used for torsion identification or coding of the filler cap 4. For instance, two such bores 5 may be arranged at an accurately defined pitch angle of e.g. 170°, so that the filler cap 4 can be opened only by means of a corresponding insertion key having pins offset at the same angle of 170° and fitting into bores 5. An insertion key of this kind may preferably be located in a convenient manner at the filling connection or inside of the vehicle, so that this insertion key is always at hand when needed for fuelling. The first variant also allows a specific allocation of a certain type of gas or filling pressure to be realized.

Further, on the front side C a receptacle 7' for a sensor 7 (see FIG. 2) is provided in the inner housing sleeve 2b, which sensor 7 determines the proper insertion state of the filler cap 4. This ensures that, when the filler cap 4 is inserted, the fuelling fixture 1 is properly locked and disconnected from the filling connection. This sensor 7 may respond to contact with the filler cap 4, since the latter is screwed in down to the micro-switch or the sensor 7. Preferably, however, in order to prevent spark formation, the sensor 7 is formed as an inductive switch (e.g. as a Hall sensor or Reed contact), the filler cap consisting of a magnetizable material such as steel, so that the filler cap 4 activates the sensor 7 in the screwed-in position as illustrated here. This "activation" will always occur in such a manner that the vehicle is immobilized when the filler cap 4 is off, while the vehicle can be started when the filler cap 4 is properly inserted.

Moreover, a bore 13 serving as fluid passage is provided below the fastening nut 8b of the fuelling nipple 8, which allows controlled ventilation from the interior D between the filler cap 4 and the fuelling nipple 8 to take place. For example, a thin hose may be connected here, which can be used to branch off any gas escaping in the case of a defective fuelling nipple 8 to a safe place.

Figure 2:
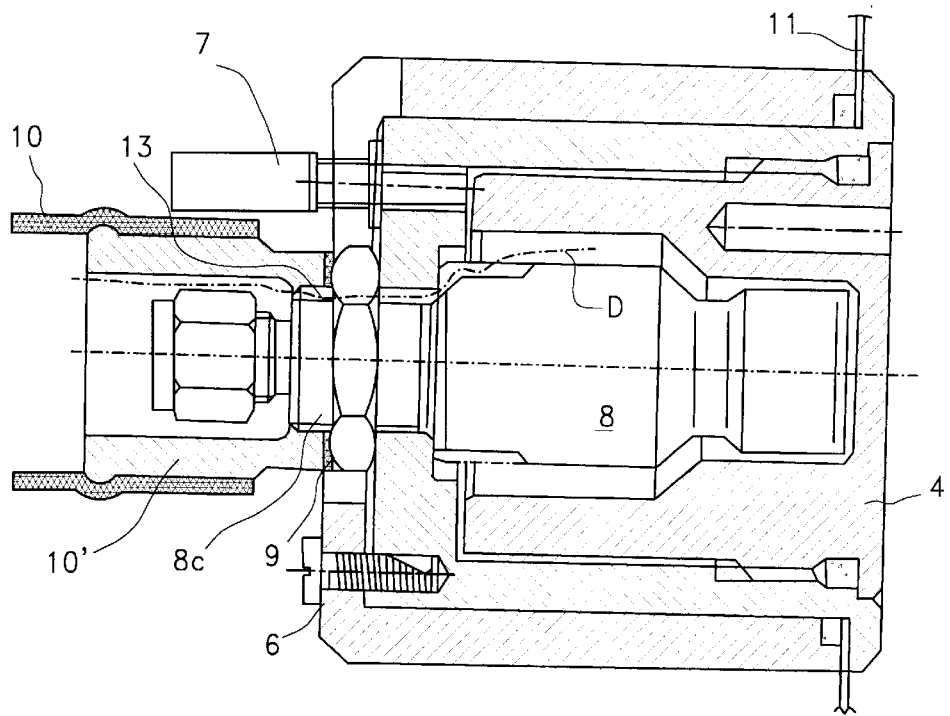
FIG. 2 shows a fuelling fixture similar to FIG. 1, but with an additional ventilation line connected.

FIG. 2 shows a preferred embodiment of the fluid passage 13, the fuelling fixture otherwise having the same construction. Namely, a coaxial ventilation line 10 is fitted over the filling line 12, which ventilation line is fixed to the connection thread 8c of the fuelling nipple 8 by means of a sleeve 10'. By means of a ring seal 9 between the sleeve 10' and the union nut 8b, sealing towards the outside is achieved, so that any gas escaping from the fuelling nipple 8 may flow through the fluid passage 13 along the connection thread 8c to the ventilation line 10, as indicated by a dashed and dotted line. To create this fluid passage 13, it is e.g. sufficient to mill a narrow axial groove along the connection thread 8c of the fuelling nipple 8 up to the bearing surface 8a, so that a passage to the interior D is generated.

It is noted here again that due to the seal 4a in the area of the screw-thread 4b of the filler cap 4, any escaping of gas towards the outside on the filling side B is securely prevented, while the ventilation line 10 may be guided to a safe place on the vehicle such under the bottom of the vehicle. In this connection, several seals 4a may also be provided on the outer perimeter or also on the front side of the filler cap 4.

FIG. 3 shows a further simplified version of the fuelling fixture, which is otherwise constructed in a way similar to FIGS. 1 and 2. In this figure, the same reference numerals have been used for components having identical functions. FIG. 3 shows sectional views of the fuelling fixture, which are rotated relative to each other. In contrast to FIGS. 1 and 2, the screws 6 for fastening the threaded sleeves 2a and 2b together, which are fitted into each other, are screwed in from the interior D of the housing 2. This simplifies the mounting operation of the housing substantially. In this case, the screws 6 engage in extensions 2a of the outer housing part 2a. Moreover, several reinforcement ribs 2f are provided on the inner housing part 2b in the corner area, which engage in corresponding grooves of the filler cap 4. This solution is provided especially in cases where the filler cap 4 is not screwed into the housing 2, but is locked, as shown in the bottom half, with a conventional lock 14 and key 16 (partially shown). During locking, a bolt 15 of the lock 14 engages in a ring-shaped groove of the fuelling nipple 8, so that the filler cap is locked in the axial and torsional directions. However, the bolt 15 of the lock 14 could engage also in a corresponding profiled section of the housing 2.

Of importance is further the embodiment of the outer housing sleeve 2a shown in the bottom half of FIG. 3, which has several spring-loaded catch hooks 2d on its perimeter. This enables the two housing parts 2a and 2b to be fitted together, with the catch hooks 2d engaging in the inner housing sleeve 2b. This enables fixing of the two housing sleeves 2a and 2b to each other during mounting and transport to be achieved.

Thus, a fuelling fixture 1, which can be readily fixed to the vehicle body, is provided, which ensures particularly secure encapsulation of the fuelling nipple 8. Thus, by means of the encapsulation, not only secure fastening but also complete dust-tightness of the fuelling nipple 8 is enabled, and freezing is securely prevented. Moreover, the components of the fuelling fixture 1 serve several functions, e.g. the filler cap 4 can activate the sensor 7 in a preferred manner for immobilisation, so that starting of the vehicle with the filler cap 4 removed is securely prevented.

What is claimed is:

1. A fueling fixture for vehicles, comprising:
   a fueling nipple configured to attach to a filling connection; and
   a pot-like housing enclosing the fueling nipple, and configured to receive a filler cap enclosing the fueling nipple, the filler cap having a characteristic torsion identification with bores for engaging one of a torsion tool and a lock.

2. The fuelling fixture of claim 1, wherein the housing comprises two pot-like housing sleeves fitted into each other, the sleeves fixed to a body of a vehicle.

3. The fuelling fixture of claim 2, wherein the housing sleeves include an inner housing sleeve screwed against a flange of the fuelling nipple.

4. The fuelling fixture of claim 2, further comprising a seal located between the two housing sleeves fitted into each other.

5. The fuelling fixture of claim 2, wherein the housing sleeves fitted into each other are fastenable relative to each other with screws for fixing to a body of a vehicle.

6. The fuelling fixture of claim 5, wherein the screws are arranged on front sides of the housing sleeves facing away from the filler cap.

7. The fuelling fixture of claim 1, wherein the filler cap is formed flush with an outer surface of the housing.

8. The fuelling fixture of claim 1, further comprising at least one ring seal positioned between the filler cap and the housing.

9. The fuelling fixture of claim 1, further comprising a sensor positioned on a front side of the housing facing away from the filler cap, the sensor determining a disconnected state of the filling connection and an inserted state of the filler cap.

10. The fuelling fixture of claim 1, wherein a ventilation line is connected to an outlet side of the fuelling fixture, the ventilation line being in communication with an interior between the filler cap and the fuelling nipple.

11. A fuelling fixture for a vehicle, comprising:

a fuelling nipple configured to attach to a filling connection; and a pot-like housing enclosing the fuelling nipple, and configured to receive a filler cap enclosing the fuelling nipple, wherein the filler cap has a characteristic torsion identification with bores for engaging one of a torsion tool and a lock, wherein the housing includes an outer sleeve having a base portion and an inner sleeve having a base portion, and wherein said inner sleeve includes a collar, said inner and outer sleeves being secured together at said base portions with fasteners, such that a body of the vehicle is clamped between said collar and said outer sleeve.

12. A fuelling fixture for a vehicle, comprising:

a fuelling nipple configured to attach to a filling connection; and a pot-like housing enclosing the fuelling nipple, and configured to receive a filler cap enclosing the fuelling nipple;

wherein the housing includes an outer sleeve having a base portion and an inner sleeve having a base portion, wherein said inner sleeve includes a collar, said inner and outer sleeves being secured together at said base portions with fasteners, such that a body of the vehicle is clamped between said collar and said outer sleeve, and wherein said fasteners extend from behind and through the outer sleeve.

* * * * *